United States Patent
Gruen (10) Patent No.: US 10,043,145 B2
(45) Date of Patent: *Aug. 7, 2018

(54) JUST IN TIME LEARNING DRIVEN BY POINT OF SALE OR OTHER DATA AND METRICS

(71) Applicant: INTERNATIONAL BUSINESS MACHINES CORPORATION, Armonk, NY (US)

(72) Inventor: Daniel M Gruen, Newton, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 412 days.

This patent is subject to a terminal disclaimer.

(21) Appl. No.: 14/727,091

(22) Filed: Jun. 1, 2015

(65) Prior Publication Data

US 2016/0350697 A1  Dec. 1, 2016

(51) Int. Cl.
*G06Q 10/00* (2012.01)
*G06Q 10/06* (2012.01)

(52) U.S. Cl.
CPC ........ *G06Q 10/06395* (2013.01); *G06Q 10/063114* (2013.01); *G06Q 10/063118* (2013.01)

(58) Field of Classification Search
CPC .......................................... G06Q 10/00–50/00
USPC ................................. 705/7.11–7.42
See application file for complete search history.

(56) References Cited

U.S. PATENT DOCUMENTS

| | | | | |
|---|---|---|---|---|
| 5,788,504 A | * | 8/1998 | Rice ................... | G09B 19/0069 434/219 |
| 6,763,342 B1 | * | 7/2004 | Mattern ............ | G06F 17/30873 706/45 |
| 6,901,374 B1 | * | 5/2005 | Himes ................. | G06Q 10/087 705/14.37 |
| 7,181,413 B2 | * | 2/2007 | Hadden .................... | G09B 7/00 434/107 |
| 7,321,886 B2 | * | 1/2008 | Swaminathan ........ | G06Q 10/06 705/1.1 |
| 8,275,811 B2 | * | 9/2012 | Reid ...................... | G06Q 30/02 707/705 |

(Continued)

OTHER PUBLICATIONS

Cawe, "Factors Contributing to Employee Engagement in South Africa." Diss. University of the Witwatersrand, Sep. 2006, pp. 1-113.

(Continued)

*Primary Examiner* — Alan S Miller
(74) *Attorney, Agent, or Firm* — Tutunjian & Bitetto, P.C.; Yeen C. Tham (57) ABSTRACT

A method and system are provided. The method includes monitoring, by a processor-based monitoring device, work metrics, indicative of work performance, of a plurality of users. The method further includes soliciting input, by a user input solicitation device, from any of the plurality of users who have success regarding at least one work task, regarding activities which led to the success and suggestions on how other users can benefit from the input. The method also includes providing, by an input dissemination device, the input to a particular user identified from among the plurality of users as needing improvement in performing the at least one work task. The success is determined by evaluating the work metrics with respect to at least one threshold.

8 Claims, 7 Drawing Sheets

(56) References Cited

U.S. PATENT DOCUMENTS

| | | | |
|---|---|---|---|
| 8,359,251 B2 | 1/2013 | Lamoureux et al. | |
| 8,751,288 B2 | 6/2014 | Thompson et al. | |
| 8,756,086 B1* | 6/2014 | Feldman | G06Q 10/00 705/7.15 |
| 2001/0036623 A1* | 11/2001 | Johnson | G09B 7/02 434/350 |
| 2002/0077884 A1* | 6/2002 | Sketch | G06Q 10/10 705/12 |
| 2002/0091558 A1* | 7/2002 | Anderson | G06Q 10/06311 705/7.13 |
| 2002/0106622 A1* | 8/2002 | Osborne | G09B 5/12 434/350 |
| 2002/0173934 A1* | 11/2002 | Potenza | G06Q 30/0203 702/182 |
| 2003/0083923 A1* | 5/2003 | Guicciardi | G06Q 10/10 705/300 |
| 2003/0088436 A1* | 5/2003 | Berger | G06Q 10/20 705/304 |
| 2004/0153368 A1* | 8/2004 | Freishtat | G06Q 30/06 705/26.41 |
| 2004/0153428 A1* | 8/2004 | Reid | G06Q 30/02 706/50 |
| 2005/0027696 A1* | 2/2005 | Swaminathan | G06Q 10/06 |
| 2006/0281065 A1* | 12/2006 | Margiotta | G09B 19/00 434/365 |
| 2007/0192173 A1* | 8/2007 | Moughler | G06Q 10/06 705/7.21 |
| 2008/0021769 A1* | 1/2008 | Higgins | G06Q 10/0631 705/7.24 |
| 2008/0059292 A1* | 3/2008 | Myers | G06Q 10/06 705/7.39 |
| 2009/0248460 A1 | 10/2009 | Johnson | |
| 2009/0276281 A1* | 11/2009 | Foltz | G06Q 10/06 705/7.14 |
| 2009/0319344 A1* | 12/2009 | Tepper | G06Q 10/06393 705/7.39 |
| 2010/0293039 A1* | 11/2010 | Whitsitt | G06Q 10/06 705/7.42 |
| 2011/0153597 A1* | 6/2011 | Christensen | G06N 5/02 707/723 |
| 2012/0082961 A1* | 4/2012 | Margiotta | G09B 19/00 434/107 |
| 2012/0317209 A1* | 12/2012 | Briggs | G06Q 30/0241 709/206 |
| 2013/0110565 A1 | 5/2013 | Means, Jr. et al. | |
| 2013/0173355 A1* | 7/2013 | Barcenas | G06Q 10/06393 705/7.39 |
| 2013/0179236 A1* | 7/2013 | Hicyilmaz | G06Q 10/06398 705/7.42 |
| 2013/0226821 A1 | 8/2013 | Chetwynd et al. | |
| 2016/0055436 A1* | 2/2016 | Al-Taha | G06Q 10/101 705/7.36 |

OTHER PUBLICATIONS

Mantel et al. "A Realistic Sales Experience: Providing Feedback by Integrating Buying, Selling, and Managing Experiences." Journal of Personal Selling & Sales Management, Jan. 2002 vol. 22.1, pp. 33-40.

Asiegbu et al., "Sales Force Competence Management: Its Relevance and Framework," European Journal of Business and Management, 2012, vol. 4, No. 9, pp. 1-12.

Delvecchio et al., "Big Brother or Big Bother? E-monitoring the Salesforce." Journal of Business & Industrial Marketing 28.4, 2013: pp. 288-302.

Creech, "Measuring While You Manage: Planning, Monitoring and Evaluating Knowledge Networks." International Institute for Sustainable Development (IISD)(www.Dgroups.org/groups/pelican/docs/Creech2001_measuring_while_you_manage. pdf), 2001, pp. 1-30.

* cited by examiner

FIG. 7

JUST IN TIME LEARNING DRIVEN BY POINT OF SALE OR OTHER DATA AND METRICS

BACKGROUND

Technical Field

The present invention relates generally to education and, in particular, to just in time learning driven by point of sale of other data and metrics.

Description of the Related Art

Corporate learning is typically separated from ongoing, day-to-day work, key business metrics, and automatic and timely performance management. Corporate learning typically involves formal static lessons that require significant investment of time and the use of separate systems that are not integrated in ongoing work activities. Decisions on what to learn are made at specific times when the employee or manager chooses to focus on learning goals, but are not modified on an ongoing dynamic basis, and are not quickly reactive to needs or opportunities to learn as they arise. In addition, learning content is often time consuming and costly to create, and involves a selected set of dedicated learning content creators with little ongoing integration of insights from other employees.

SUMMARY

According to an aspect of the present principles, a method is provided. The method includes monitoring, by a processor-based monitoring device, work metrics, indicative of work performance, of a plurality of users. The method further includes soliciting input, by a user input solicitation device, from any of the plurality of users who have success regarding at least one work task, regarding activities which led to the success and suggestions on how other users can benefit from the input. The method also includes providing, by an input dissemination device, the input to a particular user identified from among the plurality of users as needing improvement in performing the at least one work task. The success is determined by evaluating the work metrics with respect to at least one threshold.

According to another aspect of the present principles, a system is provided. The system includes a processor-based monitoring device for monitoring work metrics, indicative of performance, of a plurality of users. The system further includes a user input solicitation device for soliciting input, from any of the plurality of users who have success regarding at least one work task, regarding activities which led to the success and suggestions on how other users can benefit from the input. The system also includes an input dissemination device for providing the input to a particular user identified from among the plurality of users as needing improvement in performing the at least one work task. The success is determined by evaluating the work metrics with respect to at least one threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to just in time learning driven by point of sale of other data and metrics.

In an embodiment, specifically selected, small, learning items and activities are suggested to employees (or other students) when opportunities to improve specific performance areas are discovered. These are presented through the employee's mobile phone or through other systems with which the employee regularly interacts. Content created by fellow employees can be accessed, and high performing employees, or employees who have shown significant performance increases are automatically encouraged to create tips and/or other learning content. Regarding the latter, as an example, an employee can be sent a message that states "Wow, you just doubled your sales this quarter! What tips do you have for fellow employees on how you did it?". Other encouragement approaches can also be used, while maintaining the spirit of the present principles.

Figure 1:
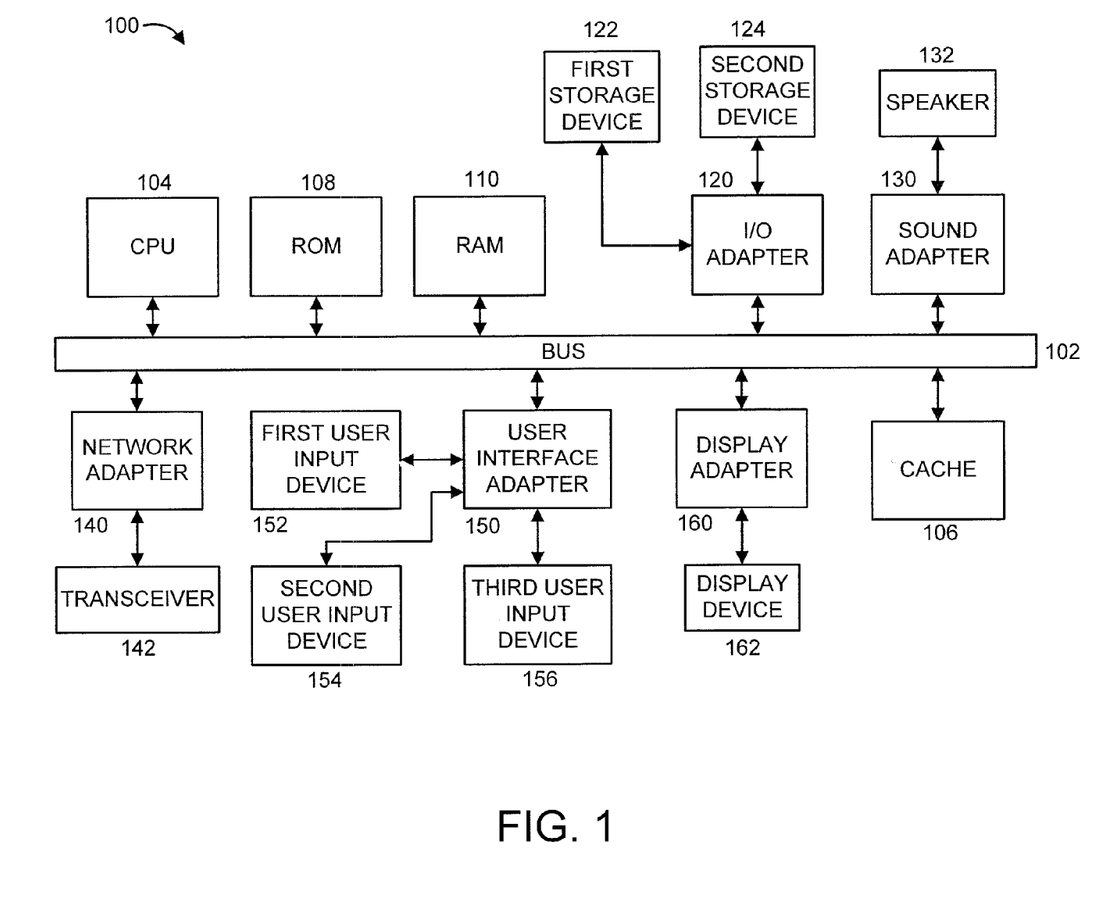
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
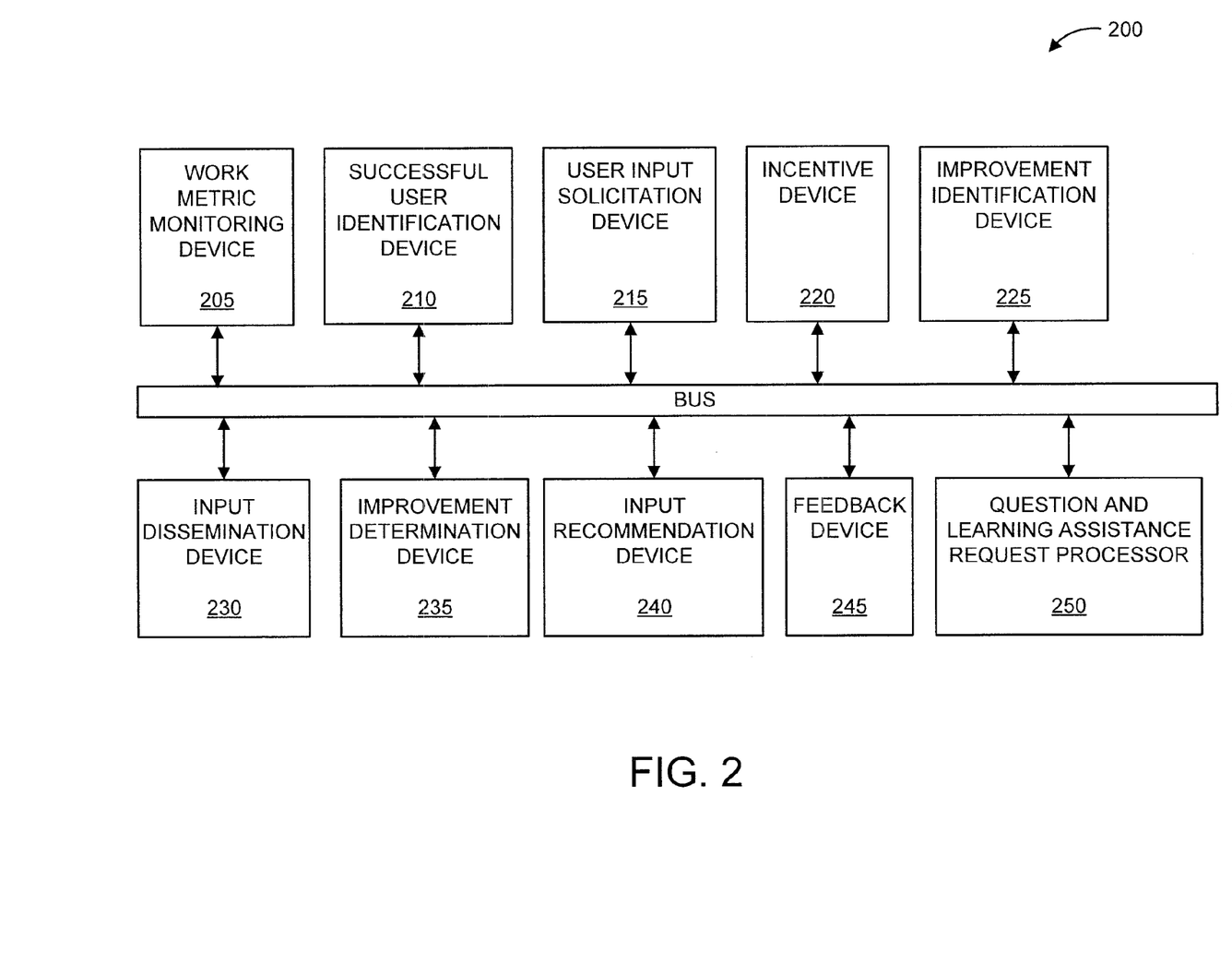
FIG. 2 shows an exemplary system 200 for just in time learning, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
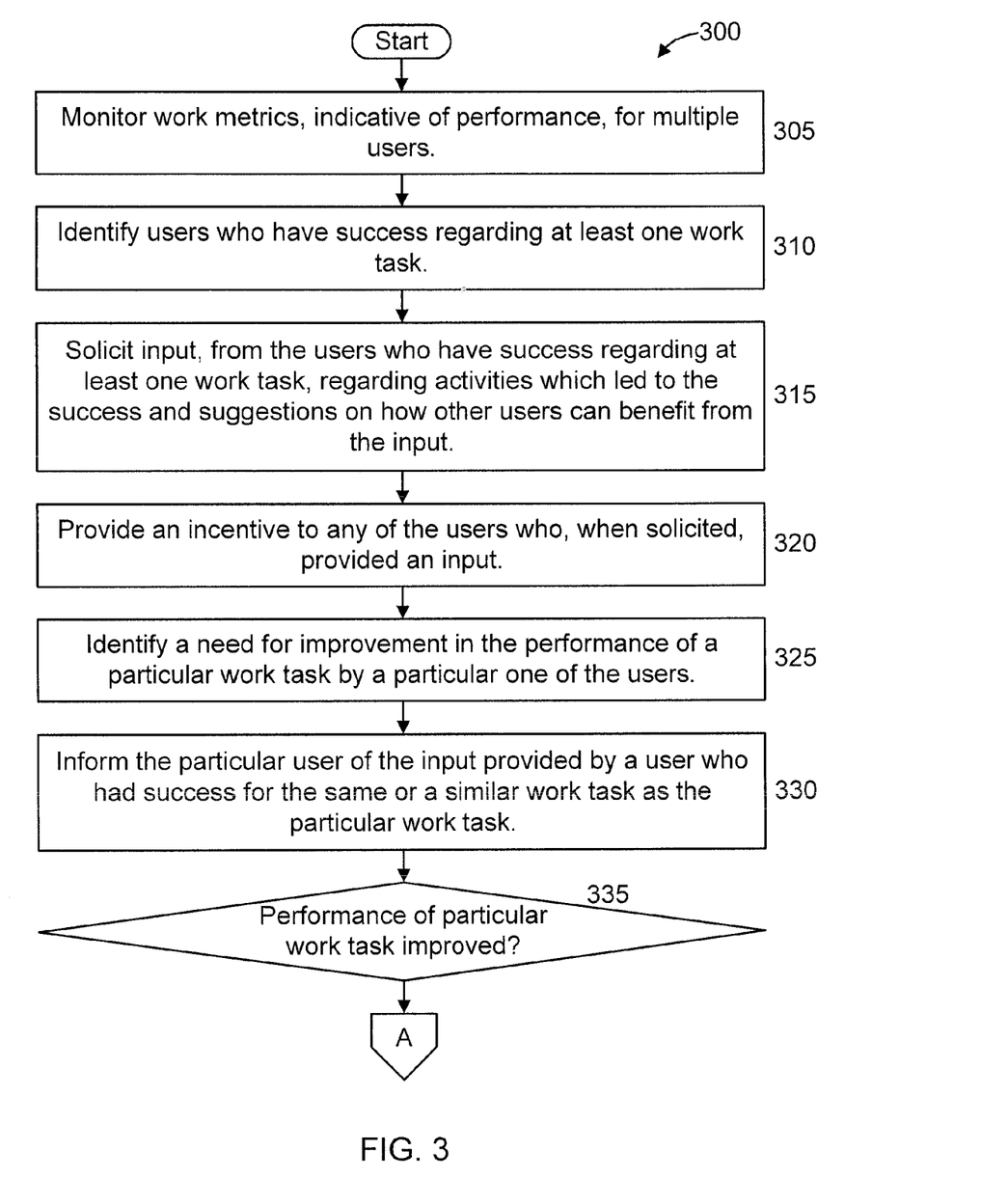
FIGS. 3-4 shows an exemplary method 300 for just in time learning, in accordance with an embodiment of the present principles.
Figure 4:
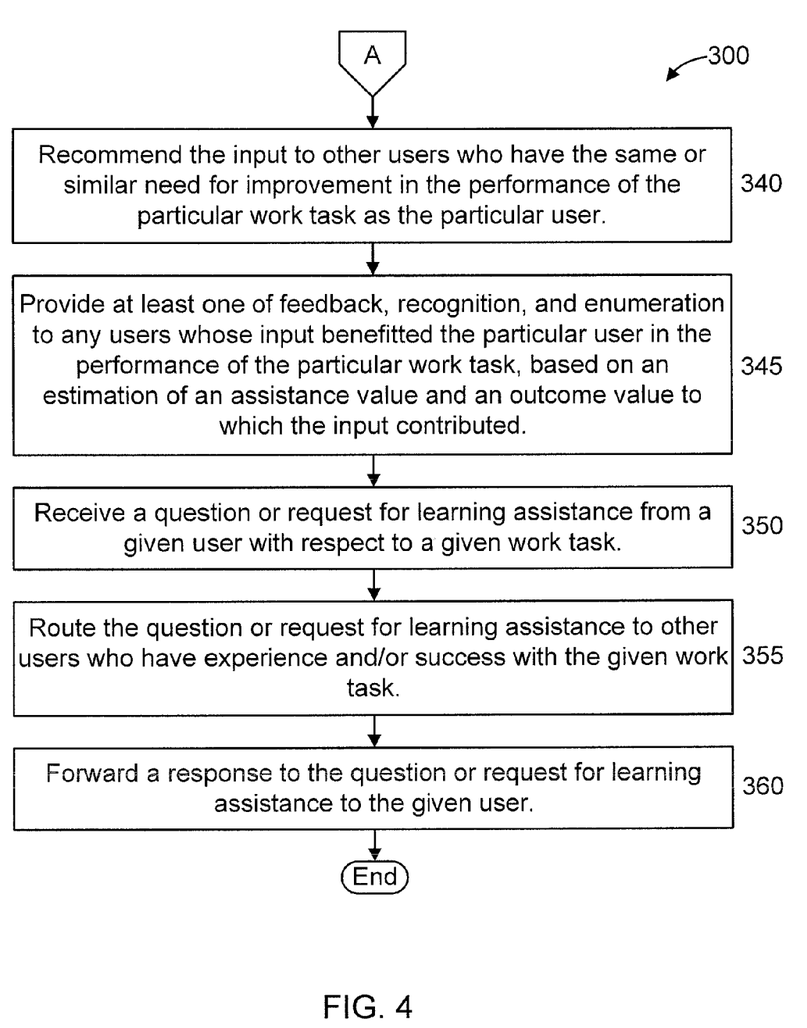

Further, it is to be appreciated that processing system 100 may perform at least part of the method described herein including, for example, at least part of method 300 of FIGS. 3-4. Similarly, part or all of system 200 may be used to perform at least part of method 300 of FIGS. 3-4.

FIG. 2 shows an exemplary system 200 for just in time learning, in accordance with an embodiment of the present principles.

The system 200 includes a work metric monitoring device 205, a successful user identification device 210, a user input solicitation device 215, an incentive device 220, an improvement identification device 225, an input dissemination device 230, an improvement determination device 235, an input recommendation device 240, a feedback device 245, and a question and learning assistance request processor 250.

The work metric monitoring device 205 monitors work metrics, indicative of performance, for multiple users. The work metric monitoring device 205 can monitor the work metrics from multiple sources including, but not limited to, company servers/websites/databases, social media, and so forth. The work metrics can include, but are not limited to, Point of Sale (POS) data, Key Performance Indicators (KPIs), sales metrics (e.g., number of units sold, profit, number of overall vendors, number of new vendors in a given time period, and so forth), output metrics (e.g., number of items produced, managed and/or otherwise processed), mystery shop scores, and so forth. It is to be appreciated that the preceding work metrics are merely illustrative and, thus, the present principles can be used with other work metrics, while maintaining the spirit of the present principles.

The successful user identification device 210 identifies users who have success regarding one or more work tasks. As used herein, "success" refers to some measure of accomplishment in performing one or more work tasks as compared to failing or being mediocre. Success can be measured, for example, by comparing one or more work metrics to one or more thresholds, or some other approach to quantify success. For example, employees with sales above a given monetary threshold, or above a given number of sold units, or to the most vendors, or to the most new vendors in a given time period, and so forth, can be identified. As another example, employees who have produced, managed and/or otherwise processed a given number of items above a threshold number, and so forth. It is to be appreciated that the preceding ways in which to measure success are merely illustrative and, thus, the present principles can be used with other ways in which to measure success, while maintaining the spirit of the present principles.

The user input solicitation device 215 solicits inputs, from the users who have success regarding the one or more work tasks, regarding activities which led to the success and suggestions on how other users can benefit from the input. The inputs can be solicited by querying users over their mobile devices, computers, and/or any other systems/devices with which the users interact. In an embodiment, the input can include learning content. In an embodiment, the input/learning content can include, but is not limited to: reminders; tips; opening lines; blog content; social media content; video content; audio content; multimedia content; and so forth. It is to be appreciated that the preceding learning content is merely illustrative and, thus, the present principles can be used with other learning content, while maintaining the spirit of the present principles.

The incentive device 220 provides an incentive to any of the users who, when solicited, provided an input. The incentive device 220 can be configured to provide incentives to a user, for example, on the user's own devices (e.g., send a coupon for a free movie to the user's cell phone, etc.), by providing the user with a link to a webpage that includes the incentive for the user (the coupon for the free movie, a public accolade, and so forth), and so forth. It is to be appreciated that the preceding incentives are merely illustrative and, thus, the present principles can be used with other types of incentives and other ways in which to provide the incentives, while maintaining the spirit of the present principles.

The improvement identification device 225 identifies a need for improvement in the performance of a particular work task by a particular one of the users (hereinafter "particular user"). In an embodiment, the need for improvement can be identified based on the monitored work metrics and/or on some other basis. In an embodiment, the need for improvement can be identified by comparing the work metrics for the particular user against work metrics for other users. It is to be appreciated that the preceding ways in which to identify a need for improvement of a particular work task by a particular user are merely illustrative and, thus, the present principles can be used with other ways in which to identify a need for improvement, while maintaining the spirit of the present principles.

The input dissemination device 230 informs the particular user of the input provided by a user who had success for the same or a similar work task as the particular work task. In an embodiment, one or more of the following can be made available to a user: actual learning content; providing a way to access the learning content; and/or identifying a way to access the learning content. The learning content can be provided or accessed using a mobile device (e.g., a smart phone, tablet, computing device, and so forth) of the particular user or any other system(s) that can be used by the particular user.

The improvement determination device 235 determines if the performance of the particular work task by the particular user has improved. The improvement determination device 235 can make the determination by comparing work metrics obtained prior to the particular user being made aware of the input (solicited by the user input solicitation device 215) to work metrics obtained thereafter.

The input recommendation device 240 recommends the input to other users who have the same or similar need for improvement in the performance of the particular work task as the particular user.

The feedback device 245 provides feedback to any users whose input benefitted the particular user in the performance of the particular work task. In an embodiment, the feedback can involve some type of reward provided to such users, whether simply public acknowledgement (e.g., on an internal company website, an external company website, a social media website, and so forth) or a pecuniary-based reward. In the case of a pecuniary-based reward, the feedback device 245 can provide, for example, a link to the user for accessing the reward. Of course, other types of feedback can also be used, while maintaining the spirit of the present principles.

The question and learning assistance request processor 250 receives a question or request for learning assistance from a given user with respect to a given work task, routes the question or request for learning assistance to other users who have experience and/or success with the given work task, receives a response from the other users, and forwards the response to the given user.

In the embodiment shown in FIG. 2, the elements thereof are interconnected by a bus 201. However, in other embodiments, other types of connections can also be used. Moreover, in an embodiment, at least one of the elements of system 200 is processor-based. Further, while one or more elements may be shown as separate elements, in other embodiments, these elements can be combined as one element. These and other variations of the elements of system 200 are readily determined by one of ordinary skill in the art, given the teachings of the present principles provided herein, while maintaining the spirit of the present principles.

FIGS. 3-4 shows an exemplary method 300 for just in time learning, in accordance with an embodiment of the present principles.

At step 305, monitor work metrics, indicative of performance, for multiple users.

At step 310, identify users who have success regarding at least one work task.

At step 315, solicit input, from the users who have success regarding at least one work task, regarding activities which led to the success and suggestions on how other users can benefit from the input.

At step 320, provide an incentive to any of the users who, when solicited, provided an input.

At step 325, identify a need for improvement in the performance of a particular work task by a particular one of the users (hereinafter "particular user").

At step 330, inform the particular user of the input provided by a user who had success for the same or a similar work task as the particular work task. In an embodiment, this input is provided to the particular user on his/her mobile (or other) device, located proximate to and/or otherwise associated with relevant work metrics displayed on the device.

At step 335, determine if the performance of the particular work task by the particular user has improved. If so, then the method proceeds to step 340. Otherwise, the method proceeds to step 350. In an embodiment, step 335 can involve, for example, monitoring work metrics relating to the identified need for improvement for the particular user (e.g., such as the monitoring performed in step 305). Step 335 is performed subsequent to the user being informed of the input at step 330.

At step 340, recommend the input to other users who have the same or similar need for improvement in the performance of the particular work task as the particular user.

At step 345, providing at least one of feedback, recognition, and enumeration to any users whose input benefitted the particular user in the performance of the particular work task, based on an estimation of an assistance value and an outcome value to which the input contributed.

At step 350, receive a question or request for learning assistance from a given user with respect to a given work task.

At step 355, route the question or request for learning assistance to other users who have experience and/or success with the given work task. In an embodiment, step 355 can involve forwarding the question or request for learning assistance to the other users.

At step 360, forward a response to the question or request for learning assistance to the given user. In an embodiment, the response can be a newly generated response and/or can include learning content used, known, and/or created by the responder.

It is to be appreciated that method 300 embodies multiple ways in which a need for learning assistance for a user may be identified. For example, step 325 involves automatically determining such need based on monitored work metrics. Also, step 350 involves receiving a question or request for learning assistance. Depending upon the implementation one or more of the aforementioned ways may be used.

It is to be further appreciated that a user who provides an input that can benefit another user can be incentivized/rewarded (1) for initially providing the input in the first place; and (2) upon a determination that the input benefitted another user.

The system monitors ongoing work metrics, such as KPIs from business systems, for example, metrics on sales and "upsell" from Point of Sales (POS) systems. When the system detects a deficiency in performance or an opportunity to learn (for example, a high performing employee who could, with the proper training, expand their job role) the system automatically suggests learning objects and presents them to the employee on their mobile device or in other systems with which the employee will interact.

Ongoing data collection and monitoring helps determine which learning items are effective and lead to improvements in performance. This information is used to tune and optimize suggestions. Learning items can be drawn from formal content as well as from social materials (such as blogs). The system can also actively drive creation of learning content, such as by, for example: (1) identifying high performers and asking them for tips; (2) identifying people whose performance has increased, and asking them for what worked for them. These can be done in general (on an ongoing basis to keep learning materials fresh, varied, and up to date), and also to address situations where performance issues are seen and there is a lack of appropriate learning materials.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
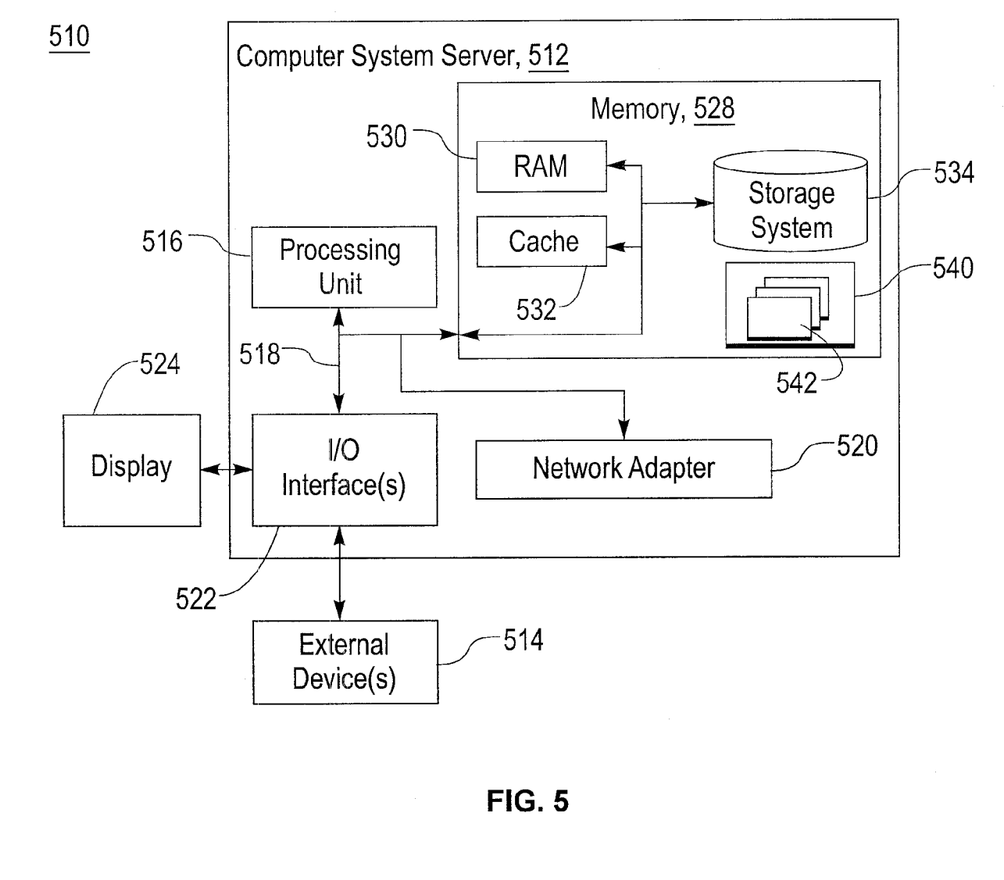
FIG. 5 shows an exemplary cloud computing node 410, in accordance with an embodiment of the present principles.

Referring now to FIG. 5, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
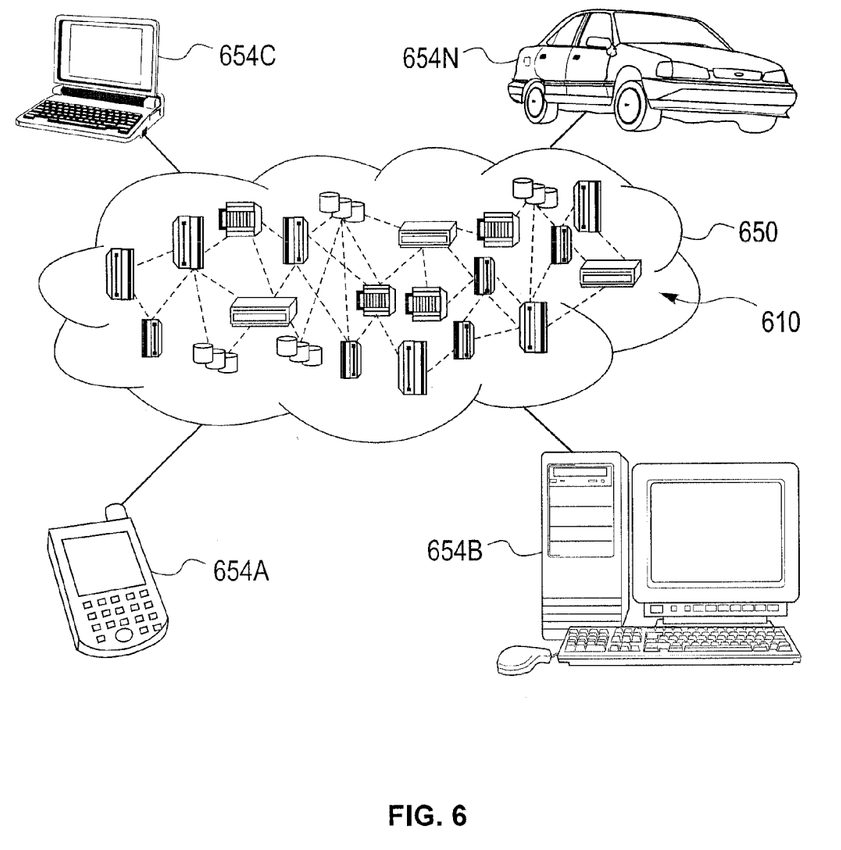
FIG. 6 shows an exemplary cloud computing environment 550, in accordance with an embodiment of the present principles.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
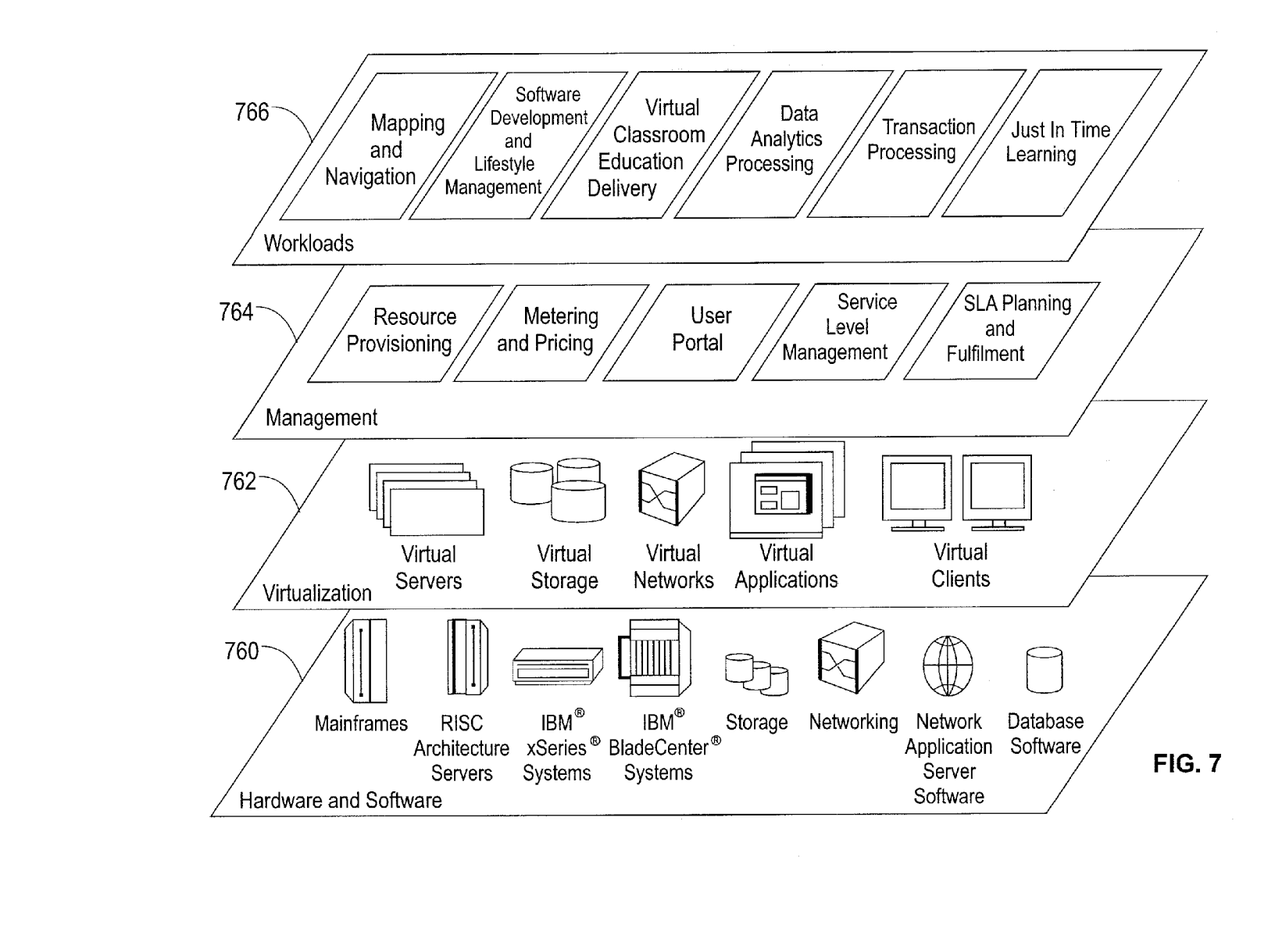
FIG. 7 shows exemplary abstraction model layers, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and just in time learning.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for increasing user performance, the computer program product comprising a computer readable storage medium having program instructions embodied therewith, the program instructions executable by a computer to cause the computer to perform a method comprising:
monitoring, by a processor-based monitoring device, work metrics, indicative of work performance, of a plurality of users, the monitoring being performed continually in real-time;
soliciting input, by a user input solicitation device, from any of the plurality of users who have success regarding at least one work task, regarding activities which led to the success and suggestions on how other users can benefit from the input;
providing, by an input dissemination device, the input to a particular user identified from among the plurality of users as needing improvement in performing the at least one work task, the input being personalized and presented on a display customized for the particular user, the display being configured to provide learning materials tailored to the particular user for improving individual work performance; and
recommending the input to other users, from among the plurality of users, who have a same need or a similar need for improvement as the particular user,
wherein the success is determined by evaluating the work metrics with respect to at least one threshold.

2. A system, comprising:
a processor-based monitoring device for monitoring work metrics, indicative of performance, of a plurality of users, the monitoring being performed continually in real-time;
a user input solicitation device for soliciting input, from any of the plurality of users who have success regarding at least one work task, regarding activities which led to the success and suggestions on how other users can benefit from the input;
an input dissemination device for providing the input to a particular user identified from among the plurality of users as needing improvement in performing the at least one work task, the input being personalized and presented on a display customized for the particular user, the display being configured to provide learning materials tailored to the particular user for improving individual work performance; and
an input recommendation device for recommending the input to other users, from among the plurality of users, who have a same need or a similar need for improvement as the particular user,
wherein the success is determined by evaluating the work metrics with respect to at least one threshold.

3. The system of claim 2, further comprising a successful user identification device for identifying any of the plurality of users who have success regarding the at least one work task, using the work metrics.

4. The system of claim 2, wherein the input comprises learning content used by any of the plurality of users who have success, and learning content that has been generated by any of the plurality of user who have success.

5. The system of claim 2, wherein the input dissemination device provides the input to the particular user by at least one of providing learning content to the particular user, providing a way to access the learning content, and identifying the way to access the learning content.

6. The system of claim 2, further comprising a feedback device for providing at least one of feedback, recognition, and enumeration to any of the plurality of users whose input benefited the particular user in the performance of the at least one work task, based on an estimation of an assistance value and an outcome value to which the input contributed.

7. The system of claim 2, wherein the processor-based monitoring device obtains updated work metrics, and the system further comprises an improvement determination device for determining, using the updated work metrics, whether the performance of the at least one work task by the particular user has benefited from the input.

8. The system of claim 2, further comprising a question and learning assistance request processor for receiving a question or request for learning assistance from a given user, from among the plurality of users, with respect to the particular work task or another work task, and routing the question or request for learning assistance to other ones of the plurality of users who have at least one of experience and success with the particular work task or the other work task.

* * * * *